United States Patent
Gandini et al.

(10) Patent No.: US 8,661,452 B2
(45) Date of Patent: Feb. 25, 2014

(54) SERVICE EXCEPTION RESOLUTION FRAMEWORK

(75) Inventors: Stefano Gandini, Cannes (FR);
Francesco Sordini, Rome (IT);
Calogero Cascio, Milan (IT); Emanuela Meiani, Rome (IT)

(73) Assignee: Accenture Global Services Limited, Dublin (IE)

( * ) Notice: Subject to any disclaimer, the term of this patent is extended or adjusted under 35 U.S.C. 154(b) by 1255 days.

(21) Appl. No.: 12/172,118

(22) Filed: Jul. 11, 2008

(65) Prior Publication Data
US 2009/0288101 A1  Nov. 19, 2009

(30) Foreign Application Priority Data
May 19, 2008  (EP) .................................. 08425352

(51) Int. Cl.
*G06F 13/00*  (2006.01)
(52) U.S. Cl.
USPC ............................................ 719/313; 719/314
(58) Field of Classification Search
USPC ............................................... 719/313, 314
See application file for complete search history.

(56) References Cited

U.S. PATENT DOCUMENTS

| 6,462,654 B1 | 10/2002 | Sandelman et al. |
|---|---|---|
| 2003/0208591 A1 | 11/2003 | Taylor |
| 2006/0218560 A1 * | 9/2006 | Dadiomov et al. ........... 719/314 |

FOREIGN PATENT DOCUMENTS

EP  0 735 471 A3  5/1999

OTHER PUBLICATIONS

EPO Search Report for corresponding PCT Application No. 08425352.5 dated Oct. 10, 2008.
Examiner's First Report on Patent Application dated Jun. 1, 2010 for co-pending Australian Application No. 2009201952.
Office Action issued in corresponding European Patent Application No. 08425352.5, mailed Jun. 28, 2013, 6 pages.

* cited by examiner

*Primary Examiner* — Andy Ho
(74) *Attorney, Agent, or Firm* — Brinks Gilson & Lione

(57) ABSTRACT

A service exception resolution framework provides a centralized exception handling console (EHC) used to reprocess unfulfilled service requests that have result in service request exceptions. The EHC allows an operator to analyze multiple service request exceptions simultaneously from disparate applications and domains. The framework greatly reduces the time, cost, and resource expenditures needed to analyze and resolve service request exceptions and reprocess service requests regardless of the applications and domains from which the service request exceptions result.

25 Claims, 15 Drawing Sheets

```
Common Exception Message Schema
L1   <?xml version="1.0" encoding="utf-16"?>
L2   <xs:schema xmlns="http://CommonExceptionMessage"
          targetNamespace="CommonExceptionMessage.xsd"
          xmlns:xs="http://www.w3.org/2001/XMLSchema">
L3     <xs:element name="CommonExceptionMessage">
L4       <xs:complexType>
L5         <xs:sequence>
L6           <xs:element minOccurs="1" maxOccurs="1" name="Header">
L7             <xs:complexType>
L8               <xs:sequence>
L9                 <xs:element minOccurs="1" maxOccurs="1" name="ServiceLabel" type="xs:string" />
L10                <xs:element minOccurs="1" maxOccurs="1" name="ServiceID" type="xs:string" />
L11                <xs:element minOccurs="1" maxOccurs="1" name="SystemName" type="xs:string" />
L12                <xs:element minOccurs="1" maxOccurs="1" name="Area" type="xs:string" />
L13                <xs:element minOccurs="1" maxOccurs="1" name="DateTime" type="xs:string" />
L14                <xs:element minOccurs="0" maxOccurs="1" name="DiscardOnFailure" type="xs:string" />
L15                <xs:element minOccurs="1" maxOccurs="1" name="ExceptionCode" type="xs:string" />
L16                <xs:element minOccurs="1" maxOccurs="1" name="ExceptionDescription" type="xs:string" />
L17                <xs:element minOccurs="0" maxOccurs="1" name="ManualRetries" type="xs:string" />
L18                <xs:element minOccurs="0" maxOccurs="1" name="FailedMessage" type="xs:string" />
L19              </xs:sequence>
L20            </xs:complexType>
L21          </xs:element>
L22          <xs:element minOccurs="1" maxOccurs="1" name="Body" type="xs:string" />
L23        </xs:sequence>
L24      </xs:complexType>
L25    </xs:element>
L26  </xs:schema>
```

FIG. 4

```
Common Exception Message Wrapper XML Template

L1    <ns0:CommonExceptionMessage xmlns:ns0="CommonExceptionMessage.xsd">
L2     <Header>
L3      <ServiceLabel>ServiceLabel_0</ServiceLabel>
L4      <ServiceID>ServiceID_0</ServiceID>
L5      <SystemName>SystemName_0</SystemName>
L6      <Area>Area_0</Area>
L7      <DateTime>DateTime_0</DateTime>
L8      <DiscardOnFailure>DiscardOnFailure_0</DiscardOnFailure>
L9      <ExceptionCode>ExceptionCode_0</ExceptionCode>
L10     <ExceptionDescription>ExceptionDescription_0</ExceptionDescription>
L11     <ManualRetries>ManualRetries_0</ManualRetries>
L12     <FailedMessage>FailedMessage_0</FailedMessage>
L13    </Header>
L14    <Body>Body_0</Body>
L15   </ns0:CommonExceptionMessage>
```

FIG. 5

Exception Message List Page 802

| | Service 306 Name | Service 308 Identifier | Date/ 310 Time | Area 314 | System 312 Name | Exception 318 Code | Exception 316 Description | Retries 322 |
|---|---|---|---|---|---|---|---|---|
| 804 ☐ | Service A | SI-123 | MMDDYY HH:MM:SS | BEA | System G | E234 | Service A exception. | 2 |
| 806 ☐ | Service D | SI-343 | MMDDYY HH:MM:SS | ADG | System K | E492 | Service D exception. | 4 |
| 808 ☐ | Service T | SI-522 | MMDDYY HH:MM:SS | GCF | System J | E305 | Service T exception. | 1 |

[Select All 810] [Resubmit 812] [Delete 814] [Edit 816] [Drain Resubmission Queue 818]

| Search Area – Advanced Filter Area | 1002 | | | | | Normal Search | 162 | Y/N |
|---|---|---|---|---|---|---|---|---|

| Service Identifier | 308 | | | Exception Code | 318 | |
|---|---|---|---|---|---|---|
| Service Name | 302 | | | Area | 314 | |
| System Name | 312 | | Exception Description | 316 | | |
| From Date/Time | 1004 | DAY ▽ | MONTH ▽ | YEAR ▽ | HOUR ▽ | Minute ▽ | AM/PM ▽ |
| To Date/Time | 1006 | DAY ▽ | MONTH ▽ | YEAR ▽ | HOUR ▽ | Minute ▽ | AM/PM ▽ |
| Retries | 322 | | Failed Message | 326 | | |
| MSISDN | 328 | | | | | |

Search         Reset

FIG. 10

| Exception Message Details Page | 1102 | | | |
|---|---|---|---|---|
| Edit 1106 | Resubmit 1114 | Confirm 1108 | Cancel 1110 | Delete 1112 |

| | | |
|---|---|---|
| Service Name 306 | Service Identifier 308 | |
| Date Time 310 | System Name 312 | |
| Exception Area 314 | Exception Code 318 | |
| Exception Description 316 | | |
| Retries 322 | Discard on Fail 324 | Y/N ▽ |
| CEM Text 1104 | | |

FIG. 11

SERVICE EXCEPTION RESOLUTION FRAMEWORK

BACKGROUND OF THE INVENTION

1. Priority Claim.

This application claims the benefit of priority to EPO application Ser. No. 08425352.5, filed on May 19, 2008.

2. Technical Field.

This disclosure concerns classifying and managing service request exceptions, and reprocessing unfulfilled service requests from disparate applications and domains. In particular, this disclosure concerns handling service request exceptions in a system architecture using a service exception resolution framework.

3. Related Art.

The information systems industry continues to face demands for more services, and rapid deployment of new services, while the complexity of the underlying technologies providing the services continues to increase. Today, system integrators combine many disparate applications and domains in order to implement system architectures that include many consumer and service provider applications. Consumer applications request services from service provider applications. Many of the consumer and service applications employ custom exception handling logic used to resolve service request exceptions. System integrators embed within each application exception handling logic designed to understand how to manage service request exceptions raised as a result of an unfulfilled service request.

System architectures with multiple disparate applications that include custom exception handling logic create a significant burden for operators responsible for resolving the exceptions raised by the disparate applications. Often multiple operators with varying experience and expertise are employed to maintain system architectures with disparate applications. Each disparate application often outputs exceptions to application specific log files that are uniquely formatted, complicated to analyze and typically outputted to application specific locations. Operators must locate and understand how to analyze the log files from each disparate application and often manually resubmit service requests. Operators must also know how to determine what information is needed to resubmit a service request in order to prevent a previously raised exception from occurring again.

System architectures are often highly dynamic and tightly integrated, and include applications that are constantly being modified, added, and removed. Operators responsible for handling exceptions must analyze exceptions in the context of such a highly dynamic environment. The difficulties with reprocessing service requests in such a highly dynamic environment are further compounded by the number of disparate applications and domains with the system architecture. Operators are burdened with a laborious, tedious and error prone way to handle exceptions and reprocess service requests.

SUMMARY

The service exception resolution framework ("framework") for a system architecture provides a centralized point of control for exceptions handling. The framework implements an enterprise service bus (ESB) to which disparate applications send exception messages. The framework uses a common exception message (CEM) schema that is flexible and adaptable and used to wrap exception messages into a common exception message that the ESB communicates to an exception handling console (EHC) as a preferred graphical user interface. The EHC provides operators a way to efficiently and easily modify and resubmit individual and/or multiple exceptions based on common exception message filter parameters. Accordingly, the framework particularly relieves the respective user from mental tasks he has to perform by assisting him to handle and process exceptions and thus improved overall operability and man-machine interaction. The framework reduces the number of operators used to manage exceptions, as well as the burden to train the operators on how to locate and administer log files from disparate application that include the exception messages, and resolve exceptions.

In one implementation, a method for implementing a service exception resolution framework for a system architecture includes detecting an exception to processing a service request message, generating a service request exception message (SREM) responsive to detecting the exception, analyzing the SREM with an exception message classifier to distinguish the SREM between a first and a second exception message class, and when the SREM is of the first exception message class, communicating the SREM to a common exception message (CEM) handler and executing the CEM handler to wrap the SREM with a universal CEM wrapper, thereby (particularly automatically or semi-automatically) transforming the SREM into a new CEM. The method for implementing the service exception resolution framework includes communicating the new CEM to a centralized exception database that stores multiple CEMs, including the new CEM, originating from multiple disparate applications across the system architecture. The first exception message class may represent an asynchronous exception that the system may resolve in non-real time. The second exception message class may represent exceptions that are analyzed and/or processed by the application and/or domain that originated the service request message that resulted in the service request exception. In other designs, additional, fewer, or different message classes may categorize the exceptions that the system handles.

In one implementation, the new CEM is communicated to a message queue, and the new CEM is asynchronously communicated from the message queue to the centralized exception database. The new CEM is stored in the exception database and asynchronously retrieved from the exception database by the EHC. The EHC accepts operator input to modify the new CEM and resubmits the modified CEM for processing to at least one of the multiple disparate applications. A CEM may also be automatically modified by applying a preconfigured CEM change specifier. The EHC also accepts CEM filter parameters that are used to retrieve matching CEMs that match the CEM filter parameters from the exception database. Modified CEMs are stored in a resubmission queue and resubmitted from the resubmission queue. The CEM handler unwraps at least one of the modified CEMs to obtain a resubmittable SREM. The resubmittable SREM is communicated to a service provider responsive to the service request message originating from the at least one multiple disparate application.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 4 shows an example of a CEM schema.

FIG. 5 illustrates a CEM wrapper XML template.

FIG. 8 shows an exception message list page.

FIG. 10 shows a 'search area—advanced filter area' display.

FIG. 11 shows an example exception message details page.

DETAILED DESCRIPTION OF THE PREFERRED EMBODIMENTS

A service exception resolution framework provides a centralized exception handling console (EHC) or user interface used to reprocess unfulfilled service requests that result in service request exceptions. The EHC uses a universal common exception message (CEM) wrapper that facilitates operator analysis of multiple service request exceptions simultaneously from disparate applications and domains, thereby particularly relieving him from mental tasks relating to the analysis and/or classification of the exception messages.

Figure 1:
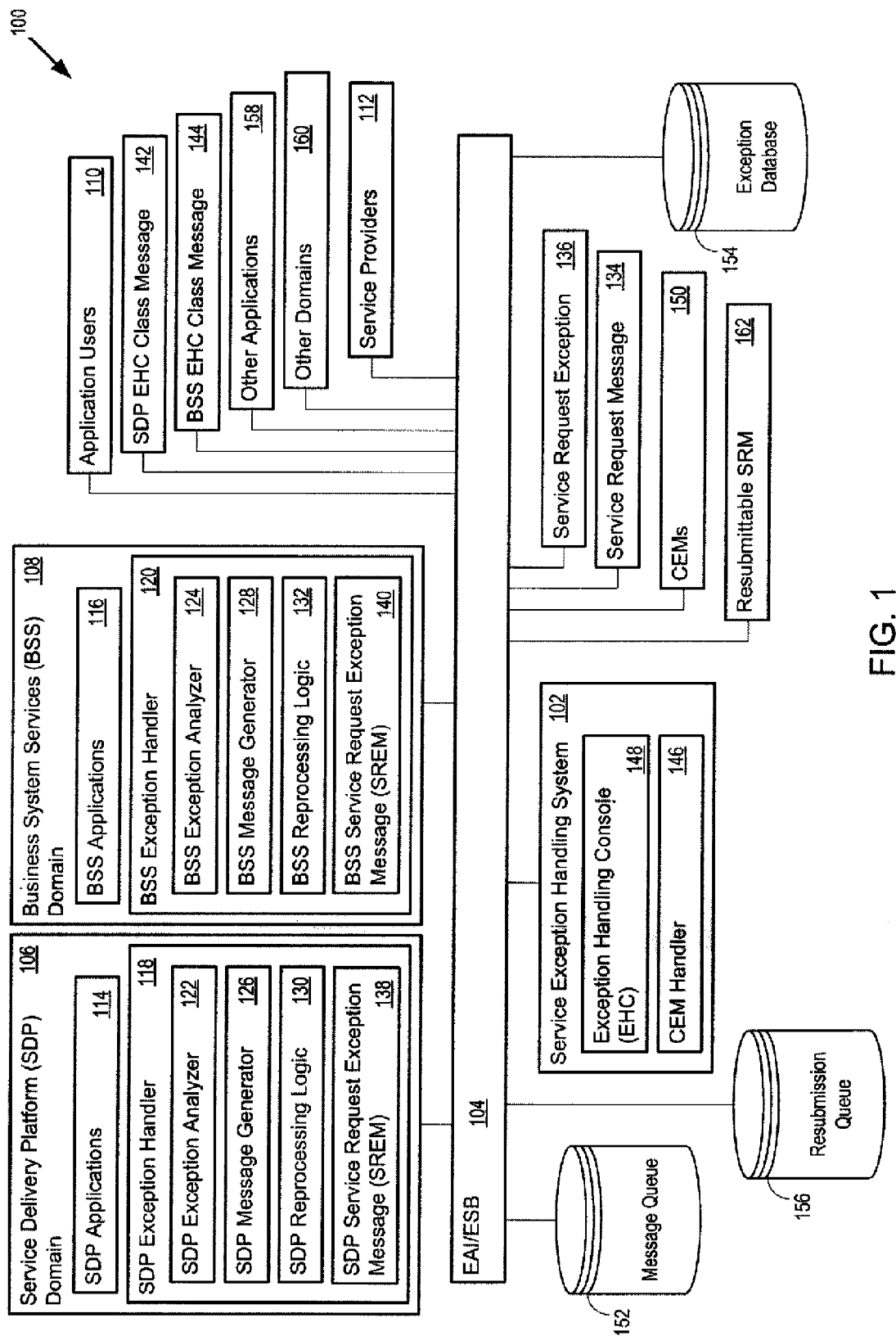
FIG. 1 shows a service exception resolution framework system architecture.

FIG. 1 shows a service exception resolution framework system architecture 100. In one implementation, the architecture 100 includes a service exception handling system 102, an enterprise application integration and service bus (EAI/ESB) 104, a service delivery platform (SDP) domain 106, a business system services (BSS) domain 108, application users 110 and service providers 112. Domains may include multiple systems that work together to provide particular services, including customer resource management (CRM), Enterprise response management (ERP) eCommerce, and billing systems. The EAI/ESB 104 facilitates communication between the various components within the architecture 100. In one implementation, the EAI/ESB 104 uses Service Oriented Architecture Protocol (SOAP) to exchange XML-based messages between applications and service providers within the CEM architecture 100. The EAI/ESB 104 permits applications to orchestrate carrying out logical cross-functional business processes. The EAI/ESB 104 provides messaging services to disparate applications so that the applications can communicate together using service requests (e.g., service request messages).

The SDP domain 106 and BSS domain 108 include applications (e.g., the SDP applications 114 and the BSS applications 116) and exception handlers (e.g., the SDP exception handler 118 and the BSS exception handler 120). In one implementation, the exception handlers 118 and 120 include respective exception analyzers 122 and 124, message generators 126 and 128 and reprocessing logic 130 and 132. The message generators 126 and 128 generate respective service request exception messages (SREM) 138 and 140. When an application 114 sends a service request message 134 to a service provider 112 and a service request exception 136 is raised as a result, the exception analyzer 122 classifies the service request exception 136. In one implementation, the service request exception 136 is raised because the service provider 112 is unavailable and/or some other resource is unavailable to the service provider 112 in order to complete the service requested. The service provider 112 may correspond to a web service (e.g., having the same name) that provides the services identified by the service provider 112. The exception analyzer 122 classifies the service request exception 134, and when the service request exception 134 is classified as an EHC class exception the service request exception message (SREM) 138 is classified an EHC class message (e.g., 142 and 144). The reprocessing logic (e.g., 130 and 132) receives resubmitted service request messages for reprocessing (discussed further below). In one implementation, the reprocessing logic (e.g., 130 and 132) provides the message generator (e.g., 126 and 128) the information used to generate the content of the SREM (e.g., 138 and 140), the SREM classification, and the number of permitted reprocessing attempts for the service request message 134.

The service exception handling system 102 includes a CEM handler 146 and exception handling console (EHC) 148. The EAI/ESB 104 forwards the EHC class messages 142 and 144 to the CEM handler 146. The CEM handler 146 wraps the EHC class messages (e.g., 142 and 144) in a CEM wrapper (discussed below) to transform the EHC class messages (e.g., 142 and 144) into CEMs 150.

The architecture 100 may further include a message queue 152, an exception database 154 and a resubmission queue 156, as well as multiple disparate applications (e.g., other applications 158 and other domains 160). In one implementation, the other applications 158 and other domains 160 include reprocessing logic responsive to reprocessing service requests. The CEM handler 146 communicates the CEMs 150 to the message queue 152. In one implementation, the EHC 148 includes an EHC web service that asynchronously retrieves a CEM 150 from the message queue 152 and communicates the CEM 150 to the exception database 154. In another implementation, the EHC web service communicates the CEM 150 to a JAVA API for XML remote procedure calls (JAX-RPC) web service using Web Services addressing (WS-Addressing). The JAX-RPC web service decomposes the CEM 150 in order to identify low level filtering and indexing information that the EHC 148 may use to retrieve and analyze CEMs 150. The JAX-RPC web service may also identify Uniform Resource Locators (URLs) from the decomposed CEMs 150 information and store that information with the CEMs 150 that the EHC web service may use to communicate resubmitted service requests to reprocessing logic responsive to reprocessing the service requests. The JAX-RPC web service stores the filtering and indexing information in the exception database 154 with the CEM 150, using the standard JAVA API for communicating with a Structured Query Language (SQL) database, that is, a Java Database Connectivity (JDBC) call to the exception database 154.

In one implementation, the EHC 148 retrieves a CEM 150 from the exception database 154, modifies the CEM 150 and communicates the modified CEM 150 to the resubmission queue 156. In another implementation, the EHC 148 communicates the modified CEM 150 to the EHC web service and the EHC web service communicates the modified CEM 150 to the resubmission queue 156. The CEM handler 146 may include destination routing logic (discuss below) that asynchronously retrieves modified CEMs 150 from the resubmission queue 156. The CEM handler 146 unwraps the retrieved modified CEM 150 to obtain a resubmittable SREM 162 and communicates the resubmittable SREM 162 to the service provider 112 responsive to the resubmittable SREM 162.

Figure 2:
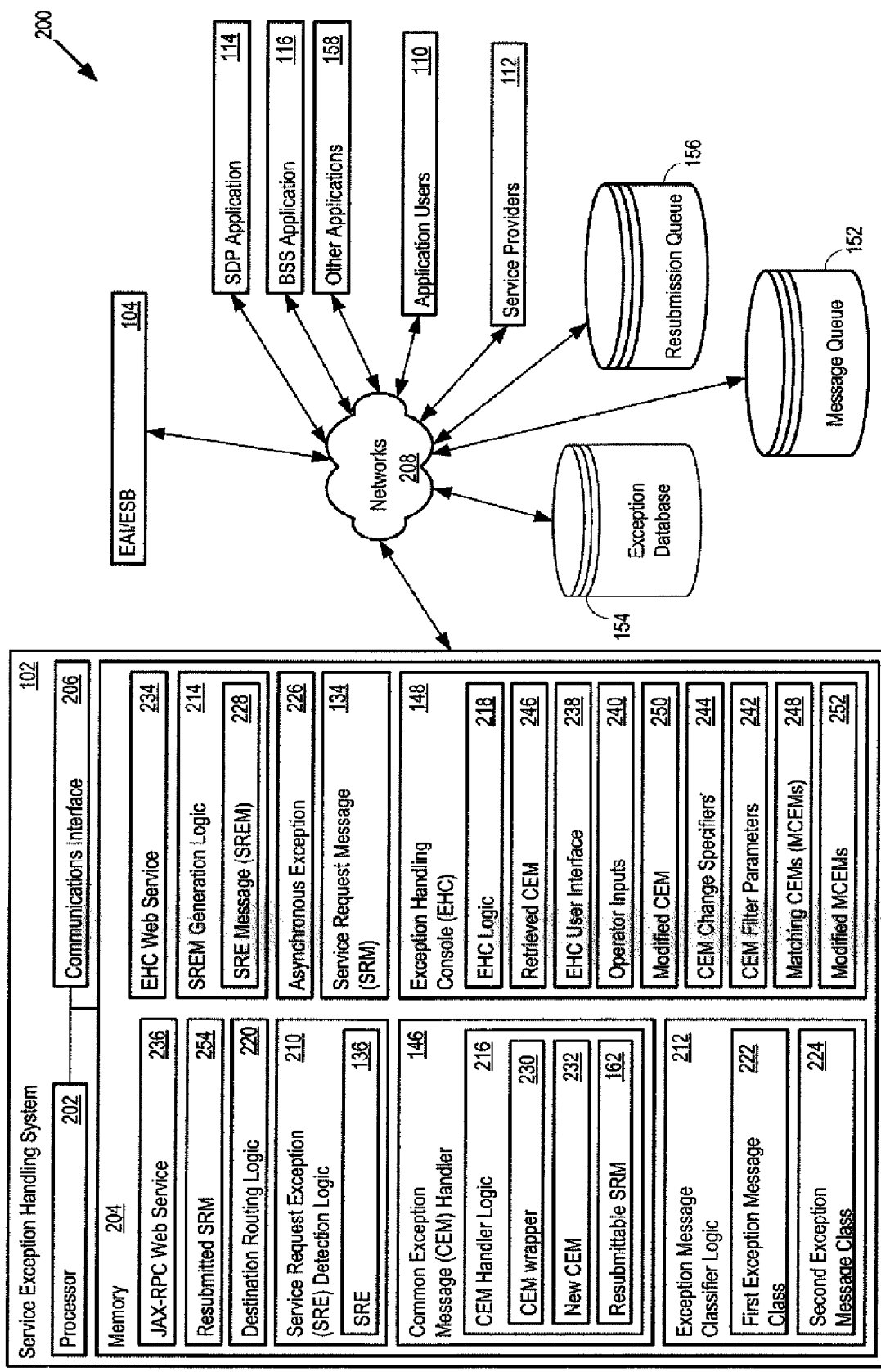
FIG. 2 shows a service exception handling system.

FIG. 2 shows one implementation of a service exception handling system 102. The service exception handling system 102 includes a processor 202, memory 204 and communications interface 206 used to communicate with various components of the architecture 100. In one implementation, the service exception handling system 102 communicates through networks (e.g., the Internet) 208 to various components of the architecture 100 using the EAI/ESB 104.

In one implementation, the service exception handling system 102 includes components that coordinate the processing of service request exceptions with the exception handlers 118 and 120, exception analyzers 122 and 124, message generators 126 and 128, and reprocessing logic 130 and 132. For example, memory 204 may include service request exception detection logic 210, exception message classifier logic 212, SREM generation logic 214, CEM handler logic 216, EHC logic 218 and destination routing logic 220 that work together with the exception handlers 118 and 120, exception analyzers 122 and 124, message generators 126 and 128 and reprocessing logic 130 and 132 to reprocess service request exceptions.

In one implementation, the service request exception detection logic 210 monitors the exception handlers (e.g., 118 and 120) and service providers 112 for the occurrence of service request exceptions 136. In another implementation, the exception handlers (e.g., 118 and 120) and service providers 112 communicate the occurrence of service request exceptions 136 to the service request exception detection logic 210. The exception message classifier logic 212 classifies the service request exception 136 (e.g., first exception message class 222 and second exception message class 224). For example, the first exception message class 222 may represent an asynchronous exception 226. In another implementation, the exception message classifier logic 212 classifies SREM 138 and SREM 140 based on whether the service request exception 136 is an asynchronous exception 226 resulting from a previously resubmitted service request message. For example, a service request exception 136 that represents an asynchronous exception 226 that results from several failed attempts to process a resubmitted service request message may have a lower classification and/or desirability for reprocessing than a service request exception 136 that represents an asynchronous exception 226 that results from only one failed attempt to reprocess.

The SREM generation logic 214 may work together with the message generator (e.g., 126 and 128) to generate the SREM 228 and include the exception message classification information in the SREM 228. In one implementation, the message generator (e.g., 126 and 128) and the SREM generation logic 214 each generate a portion of the SREM 228. In another implementation, the message generator (e.g., 126 and 128) generates a SREM (e.g., 138 and 140) that the SREM generation logic 214 uses to generate an enhanced SREM 228 with supplemental information otherwise unavailable to the message generators (e.g., 126 and 128).

Figure 3:
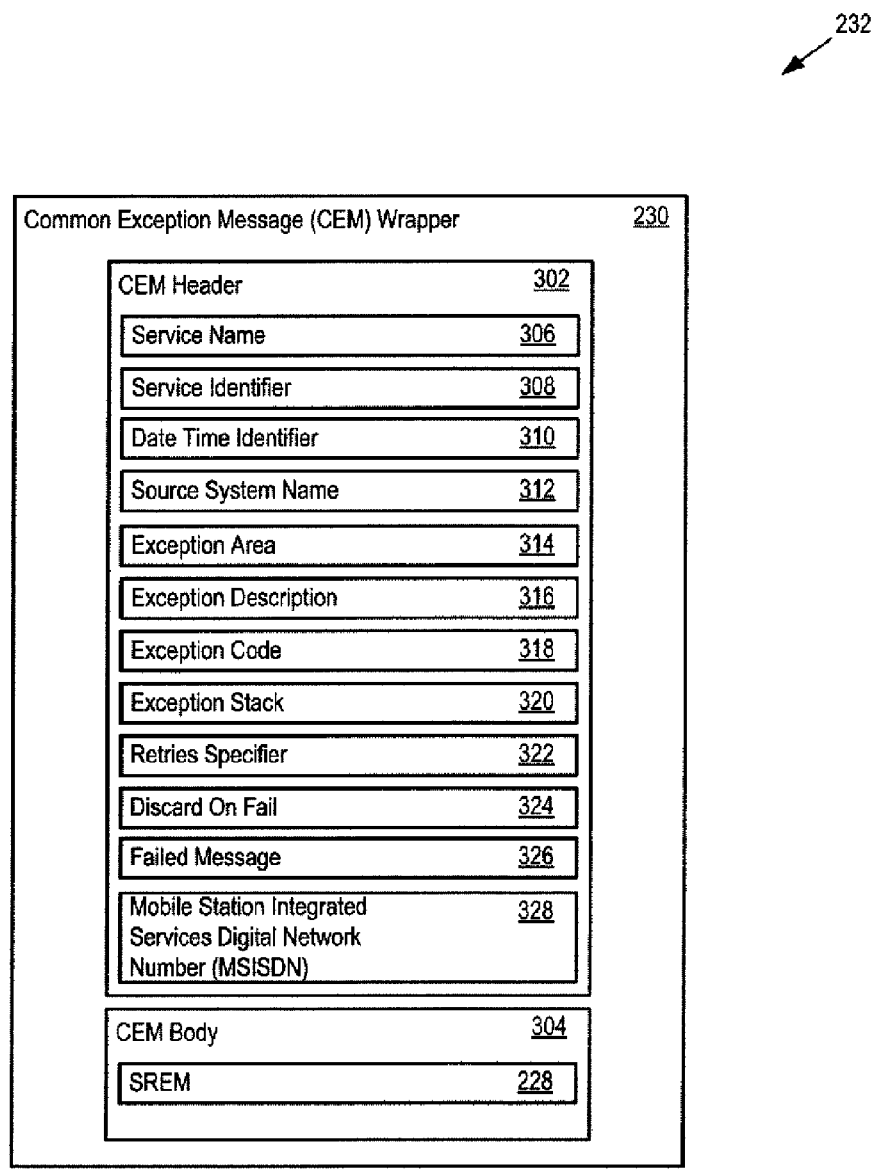
FIG. 3 shows a common exception message (CEM) wrapper.

The CEM handler logic 216 receives the SREM 228 and wraps the SREM 228 in a CEM wrapper 230 to obtain a new CEM 232. The CEM wrapper 230 includes information that the EHC 148 may use to retrieve CEMs from the exception database 154 and analyze the GEMs. Referring briefly to FIG. 3, the CEM wrapper 230 includes a CEM header 302 and a CEM body 304. In one implementation, the CEM header 302 includes a service name 306, service identifier 308, a date/time identifier 310 that identifies when the service request exception 136 occurred, a system name 312, exception area 314, exception description 316, exception codes 318, exception stack 320, retries specifier 322, discard-on-fail specifier 324 and failed message 326.

The service name 306 identifies the service provider 112 responsive to the service request message 134. In one implementation, the service name 306 identifies other applications 158 and other domains 160 that include service providers responsive to the service request message 134. In one implementation, the CEM header information includes a mobile station integrated services digital network number (MSISDN) 328 that is used to uniquely identify a subscriber (e.g., application user 110).

Table 1 provides a brief description of the information that may be included in the CEM header 302.

TABLE 1

| CEM Header Information |
|---|
| Service Label: ServiceName for service provider responsive to the service request message. |
| Service ID: A unique identifier that provides additional granularity used to route service requests to service providers. |
| Date/Time: Date and time of the service request exception. |
| System Name: Name of the system where the service request exception was raised. |
| Exception Area: Identifies the reprocessing logic that may be used to submit the resubmittable service request message for processing. |
| Exception Description: A brief description of the exception, which is displayed to the EHC operator. |
| Exception Codes: The exception code returned by the application initiating the service request, the service provider responsive to the service request, and/or generated by the SREM generation logic and displayed at the EHC. |
| Exception Stack: Complete list of details returned by the service request exception. |
| Retries: Specifies the number of times the service request message has been submitted for reprocessing and/or the number of time the service request message may be submitted for reprocessing. |
| Discard-On-Fail: The discard-on-fail specifier specifies whether a service request message can be resubmitted after the service request fails to complete successfully. |
| Failed Message: A copy of the service request message that failed to be processed. |
| MSISDN: The Mobile Station Integrated Services Digital Network Number is the standard international telephone number used to identify a subscriber (e.g., application user 110). |

The service identifier 308 provides a unique identifier that identifies where in the workflow of the service provider 112 the service request exception 136 was raised. In other words, the service identifier 308 provides process workflow granularity for the service provider 112 so that a resubmitted service request message can be reprocessed from a place in the workflow that minimizes the reprocessing of unnecessary portions of the workflow activities. For example, the service provider 112 may define workflow phase identifiers 1 through 10, corresponding to 10 workflow phases that determine how a resubmitted service request message is submitted and/or the content of the resubmitted service request message. Where the service identifier 308 corresponds to workflow phase 7, the resubmitted service request message may be reprocessed from workflow phase 7 instead of being completely reprocessed. In other words, in one implementation, the service identifier 308 facilitates reducing and/or eliminating the reprocessing of particular activities and/or tasks defined for the workflow of a service provider 112 when a resubmitted service request message is submitted by the EHC logic 218 for reprocessing.

The system name 312 identifies the system (e.g., other applications 158 and domains 160) in the architecture 100 where the service request exception 136 was raised. Identifying the system name 312 further assist analysis and submission of the resubmittable service request message. For example, the service provider 112 may enlist multiple systems (e.g., other applications 158 and domains 160) within the architecture 100 to fulfill a service request, and the system name 312 provides further granularity used to identify the source of the service request exception 136. The service identifier 308 and the system name 312 assists the EHC logic 218 to analyze the source of the service request exception 136 and facilitates the efficient processing of resubmittable service request messages 162.

The exception area 314 identifies the reprocessing logic (e.g. 130 and 132) where the resubmittable service request message may be submitted for reprocessing. In one implementation, the operator of the EHC 148 may modify the exception area 314 to specify that particular reprocessing logic process a resubmittable service request message. For example, a SREM 228 may specify that the reprocessing logic of a particular application be used to process a resubmittable service request message and the CEM handler logic 216 stores the new CEM 232 with the reprocessing logic information in the exception area 314. The operator of the EHC 148 may retrieve the new CEM 232, and analyze the current status of the architecture 100 and available resources to determine whether the reprocessing logic of another application is more appropriate for processing the resubmittable service request message. The application with the originally specified reprocessing logic may be temporarily unavailable, or permanently decommissioned and/or replaced by another application at the time the resubmittable service request message is ready to be processed. The exception area 314 facilitates the destination routing logic 220 to specify how a resubmittable service request message is processed.

The exception description 316 provides a brief description of the service request exception 136. The content of the exception description 316 may be extracted from the SREM (e.g., 138, 140 and 228), provided by the application initiating the service request (e.g., 114 and 116) and/or the service provider 112 responsive to the service request. In one implementation, the content of the exception description 316 is a composite of the descriptions provided by the SREM (e.g., 138, 140 and 228), the application originating the service request (e.g., 114 and 116) and/or the service provider 112 responsive to the service request. For example, the SREM (e.g., 138 and 140) may include a description "ABC: 550—Invalid Customer Account", while the exception analyzer (122 and 124) and the message generator (126 and 128) further provide the description "Customer Account information is unavailable", while the service provider 112 provides the description "Customer Account has Expired". The SREM generation logic 214 may combine the descriptions from the multiple sources to obtain "ABC: 550—Invalid Customer Account; Customer Account information is unavailable; and Customer Account has expired." The operator of the EHC 148 may modify the exception description 316 to further refine the description.

The exception codes 318 identify the exception code returned by the application (e.g., 114 and 116) originating the service request, the service provider 112 responsive to the service request, and/or the exception code generated by the SREM generation logic 214 and displayed by the EHC 148. In one implementation, the exception codes 318 identify one exception code defined to correspond to the exception code returned by the application (e.g., 114 and 116) originating the service request, the service provider 112 responsive to the service request, and/or the exception code generated by the SREM generation logic 214. The operator of the EHC 148 may use the exception codes 318 to analyze the service request exception 136 and determine the best approach to processing the resubmittable service request.

The exception stack 320 provides a complete list of details returned by the service request exception 136 that an operator of the EHC 148 may use to analyze the circumstances and condition of the systems and multiple disparate applications (e.g., applications 114, 116 and other applications 158, domains 106, 108 and other domains 160, and service provides 112) within the architecture 100 that resulted in the service request exception 136. In one implementation, the exception stack 320 provides the information necessary to retrace the entire processing of the architecture 100 responsive to the service request message 134 that resulted in the service request exception 136. The operator of the EHC 148 may use the exception stack 320 along with other CEM header 302 information to focus the analysis and identify the most appropriate and efficient approach to processing a resubmittable service request message.

In one implementation, the retries specifier 322 specifies the number of times a service request message 134 and/or resubmittable service request message 162 have been submitted for processing. The reprocessing logic (e.g., 130 and 132) may specify the number of times a service request message 134 and/or resubmittable service request message 162 may be submitted for processing. In one implementation, the value of the retries specifier 322 is extracted from the SREM (e.g., 138, 140 and 228), provided by the application originating the service request (e.g., 114 and 116) and/or the service provider 112 responsive to the service request. In one implementation, the value of the retries specifier 322 is determined by the SREM generation logic 214 analyzing the SREM (e.g., 138, 140 and 228), information from the application (e.g., 114 and 116) originating the service request and/or the service provider 112 responsive to the service request. For example, the SREM (e.g., 138 and 140) may specify a value of 50 retries for the retries specifier 322, while the exception analyzer 122 and 124 and the message generator 126 and 128) may specify a value of 10 retries for any service request originating from the corresponding application (e.g., 114 and 116), while the service provider 112 specifies that only 3 retries are permitted for service requests for which that service provider 112 is responsive. In another implementation, a security policy and/ or policy system may impose a value for the retries specifier 322 that the SREM generation logic 214 receives and includes in the SREM 228. In one implementation, the retries specifier 322 includes a frequency and a time period component that specify the number of retries that are permitted during a specified period of time. For example, the retries specifier 322 may specify that 10 retries are permitted during a 24-hour period. In one implementation, the exception message classifier logic 212 classifies the SREM (e.g., 138, 140 and 228) using the value retries specifier 322, along with other information such as whether the service request exception represents an asynchronous exception 226.

The discard-on-fail specifier 324 specifies whether a resubmittable service request message 162 may be resubmitted after the service request fails to complete successfully. The discard-on-fail specifier 324 may use the values 0 and 1, or 'Yes' and 'No', respectively, to specify whether a service request may be resubmitted for processing. In one implementation, although the retries specifier 332 may specify that a service request may be resubmitted for processing, the discard-on-fail specifier 324 overrides the retries specifier 332. The operator of the EHC 148 may modify the value of the discard-on-fail specifier 324, in order to accommodate operations of the architecture 100. For example, during the recovery of a particular system resource within the architecture 100, the discard-on-fail specifier 324 may be set to specify that service requests are not to be resubmitted while the system resource is recovering. Once recovery of the particular system resource completes, the operator may set the discard-on-fail specifier 324 so that service requests are allowed to be resubmitted.

The failed message 326 is a copy of the service request message 134 that failed to be processed. The failed message 326 is used to generate the resubmittable service request message 162. In one implementation, the operator of the EHC 148 modifies the failed message 326 and generates the resubmittable service request message 162 with the modifications necessary to process the resubmittable service request message 162. Once the CEM handler logic 216 wraps the SREM 228 in a CEM wrapper 230 to obtain the new CEM 232, the CEM handler logic 216 communicates the new CEM 232 to the message queue 152.

Referring back to FIG. 2, the service exception handling system 102 may include an EHC web service 234 and JAX-RPC web service 236. In one implementation, the EHC web service 234 asynchronously retrieves a new CEM 232 from the message queue 152 and communicates the CEM 150 to the exception database 154. In another implementation, the EHC web service 234 communicates the new CEM 232 to the JAX-RPC web service 236, and the JAX-RPC web service 236 decomposes the new CEM 232 in order to identify low level filtering and indexing information that the EHC logic 218 uses to retrieve and analyze CEMs. For example, the JAX-RPC web service 236 decomposes and indexes the CEM header 302 information and the content of the CEM body 304 (e.g., SREM 228), and stores the decomposed and indexing information in the exception database 154 with the content of the new CEM 232. In one implementation, the JAX-RPC web service 236 uses Java Database Connectivity (JDBC) calls, the standard JAVA API for communicating with a Structured Query Language (SQL) database, to store the new CEM 232, decomposed and indexing information in the exception database 154. In another implementation, the JAX-RPC web service 236 optimizes the filtering and indexing of the new CEM 232 information so that the EHC logic 218 can easily and efficiently manage the CEMs stored in the exception database 154.

The EHC 148 includes an EHC user interface 238 that is operable to receive operator inputs 240 including inputs that specify CEM filter parameters 242 and CEM change specifiers 244. The EHC logic 218 uses the operator inputs 240, CEM filter parameters 242 and CEM change specifiers 244 to retrieve a retrieved CEM 246 and/or matching CEMs (MCEMs) 248. A retrieved CEM 246 and matching CEMs (MCEMs) 248 illustrate the capability of the EHC logic 218 to work on one or multiple CEMs simultaneously, depending on the number of CEMs matching the CEM filter parameters 242. The operator inputs 240 may be used to transform a retrieved CEM 246 into a modified CEM 250, and MCEMs 248 into modified MCEMs 252. The operator inputs 240 may include modifications to any combination of the decomposed and/or indexing information used to store CEMs in the exception database 154, the CEM header 302 and the CEM body 304 information. The CEM filter parameters 242 may include any combination of the decomposed and/or indexing information used to store CEMs in the exception database 154, the CEM header 302 and the CEM body 304 information. The CEM change specifiers 244 automatically modify a retrieved CEM 246 and/or MCEMs 248 to obtain a modified CEM 250 and/or modified MCEMs 252. The CEM change specifiers 244 may be preconfigured so that the EHC logic 218 applies the CEM change specifiers 244 automatically to modify CEMs to obtain modified CEMs 250 and/or modified MCEMs 252. For example, the preconfigured CEM change specifiers 244 may specify that the discard-on-fail specifier 324 be set to 'Yes' for CEMs matching particular CEM filter parameters 242 so that the operator of the EHC 148 is not required to modify the CEMs individually. In another example, the preconfigured CEM change specifiers 244 specify that the exception area 314 of CEMs that match the CEM filter parameters 242 be set to specify that particular reprocessing logic (e.g., 130, 132, and/or the reprocessing logic of 158 and 160) be used to process resubmittable service request messages 162. In one implementation, the EHC logic 218 communicates the modified CEM 250 and modified MCEMs 252 to the EHC web service 234, and the EHC web service 234 communicates the modified CEM 250 and modified MCEMs 252 to the resubmission queue 156 for reprocessing.

In one implementation, the destination routing logic 220 asynchronously retrieves modified CEMs 250 and modified MCEMs 252 from the resubmission queue 156. The destination routing logic 220 analyzes the exception area 314 of a modified CEM 250 to determine where to process a resubmittable service request message 162. In one implementation, the EAI/ESB 104 communicates destination routing messages to the destination routing logic 220 that identify alternative reprocessing logic suitable for reprocessing resubmittable service request messages 162. For example, the multiple disparate applications (e.g., other applications 158 and other domains 160) each communicate a destination routing message that identifies a service queue used by alternative reprocessing logic that the destination routing logic 220 may consider when determining where to route a resubmittable service request message 162. The destination routing logic 220 analyzes the exception area 314 and destination routing messages communicated to the destination routing logic 220 from multiple disparate applications (e.g., other applications 158 and other domains 160). The destination routing logic 220 communicates to the CEM handler logic 216 the modified CEM 250 and the location of a service queue corresponding to the reprocessing logic identified for processing the resubmittable service request message 162. In one implementation, the service queue and reprocessing logic may be identified by the exception area 314 of the modified CEM 250 The destination routing logic 220 may analyze the alternative reprocessing logic options identified by the destination routing messages, along with system administration policies and practical efficiencies, when determining where to route a resubmittable service request message 162 for processing.

The CEM handler logic 216 unwraps the modified CEM 250 to obtain the resubmittable service request message 162. The CEM handler logic 216 communicates the resubmittable service request message 162 to the reprocessing logic specified by the destination routing logic 220. In one implementation, the reprocessing logic analyzes the resubmittable service request message 162 and enhances the resubmittable service request message 162 to obtain a resubmitted SRM 254. For example, the reprocessing logic may parse the resubmittable service request message 162 into multiple resubmitted SRMs 254 that are used by the reprocessing logic to optimize processing. In one implementation, although the reprocessing logic is capable of accomplishing the desired results of the original service request message 134, the reprocessing logic may be different in multiple respects from the processing logic originally used to process the original service request message 134 (e.g., more complex, improved efficiency and correcting a previous bug) and the reprocessing logic modifies the resubmittable service request message 162 accordingly to obtain the resubmitted SRM 254.

FIG. 4 shows an example of a common exception message (CEM) schema 400 implemented as an XML schema definition that defines the elements of the CEM wrapper 230. The EAI/ESB 104 forwards EHC class messages 142 and 144 to the CEM handler 146 and the CEM handler 146 wraps the EHC class messages 142 and 144 using the CEM wrapper 230 to obtain a CEM 150. FIG. 4, at lines 9 through 18, illustrates the CEM header 302 components as elements of the CEM schema 400. Line 22 of FIG. 4 shows the CEM body 304 defined as an element of the CEM schema 400.

FIG. 5 illustrates a common exception message (CEM) wrapper XML template 500, used in one implementation by the CEM handler logic 216 to obtain a CEM 150 that conforms to the CEM schema 400 shown in FIG. 4. Lines 3 through 12 of FIG. 5 illustrate some of the CEM header 302 components, while line 14 represents the CEM body 304.

Figure 6:
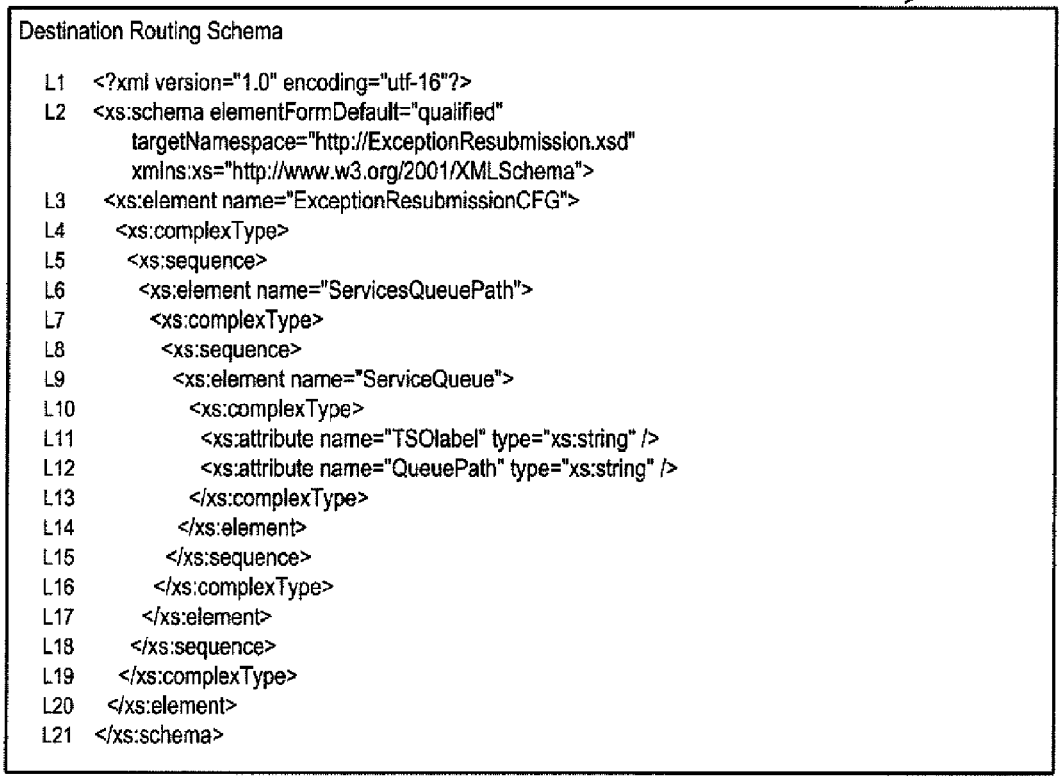
FIG. 6 shows a destination routing schema.

FIG. 6 shows a destination routing schema 600 implemented as an XML schema definition. The destination routing schema 600 defines the elements analyzed by the destination routing logic 220 to determine the service queue corresponding to particular reprocessing logic to which a resubmittable service request message 162 may be routed for processing. For example, line 6 of FIG. 6 identifies the location of the service queue defined by the service queue path element, while line 9 identifies the name element of the service queue used by the reprocessing logic, and lines 11 and 12 identify additional attributes that define the service queue. The destination routing logic 220 routes the resubmittable service request message 162 to the service queue corresponding to the reprocessing logic identified by the destination routing logic 220 and the reprocessing logic retrieves the resubmittable service request message 162 from the service queue. In one implementation, the destination routing logic 220 analyzes the exception area 314 of a modified CEM 250 and the service queues identified by destination routing messages to dynamically determine the service queue, and accordingly, the reprocessing logic to which to route the resubmittable service request message 162.

The CEM handler logic 216 unwraps the modified CEM 250 to obtain the resubmittable service request message 162. For example, the CEM handler logic 216 analyzes the failed message 326 to obtain the resubmittable service request message 162. The CEM handler logic 216 may use the exception area 314 and the reprocessing logic information provided by the destination routing logic 220 to determine the composition of the resubmittable service request message 162. The CEM handler logic 216 communicates the resubmittable service request message 162 to the service queue corresponding to the reprocessing logic determined by the destination routing logic 220.

The EHC logic 218 uses operator inputs 240, CEM filter parameters 242 and CEM change specifiers 244 to analyze and modify CEMs, and process resubmittable service request messages 162. In one implementation, the EHC logic 218 uses an EHC user interface 238 that includes a functionality list page, exception message list page, search area—normal filter area, search area—advance filter area, exception message details page, and various pages for an administration console.

Figure 7:
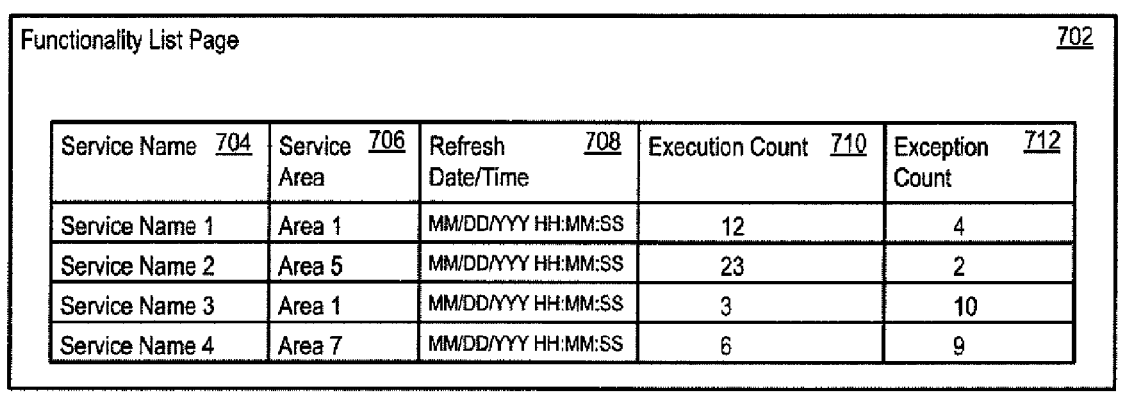
FIG. 7 illustrates an example functionality list page.

FIG. 7 illustrates an example functionality list page 702 that displays a list of EHC class services available to process EHC class messages (e.g., 142, 144, 222 and 224). In one implementation, the functionality list page 702 displays information from the exception database 154 including the service name 704 of the service providers 112 responsive to service requests, the service area 706 that identifies the application (e.g., 114, 116 and 158) and/or domain (e.g., 106, 108 and 160) that provide the services identified by the service name 704. The functionality list page may also include a refresh date/time 708 identifier that identifies when the information displayed for the service name 704 was last updated, an execution count 710 that identifies the number of service request messages 134 currently being processed by the service provider 112 identified by the service name 704, and the exception count 712 that identifies the number of service request exceptions 136 raised and currently pending reprocessing. In one implementation, the information displayed by the functionality list page 702 is non-editable. In another implementation, the functionality list page 702 accepts operator inputs 240 that modify the service name 704 and/or service area 706.

FIG. 8 illustrates an exception message list page 802 that displays the CEM wrapper 230 information for the CEMs 150 stored in the exception database 154. In one implementation, the operator of the EHC 148 may select specific CEMs 150 with the individual check buttons (e.g., 804, 806 and 808) and all the CEMs 150 using the 'select all' button 810, and resubmit, delete and edit the CEMs 150 using the resubmit button 812, delete button 814 and edit button 816, respectively. The EHC 148 may modify CEMs 150 rather than delete the CEMs 150 from the exception database 154 in order to preserve the GEMs 150 for administration and maintenance purposes. When the delete button 814 is selected for a CEM 150 the EHC 148 may mark the CEM 150 as processed (e g., 'Complete') so that the CEM 150 is not subsequently reprocessed. For example, the EHC logic 216 may set the value of the system name 312 to 'Complete' when the operator of the EHC 148 selects the delete button 814 for a CEM 150. The reprocessing logic 130 and 132 may recognize the 'Complete' value for the system name 312 to indicate that the corresponding service request not to be resubmitted. The exception message list page 802 may include a drain resubmission queue 818 button that the operator of the EHC 148 can select to delete and/or mark as 'Complete' modified CEM 250 and modified MCEMs 252 stored in the resubmission queue 156. In another implementation, the operator selects the drain resubmission queue 818 button to delete and/or mark as 'Complete' CEMs 150 in the message queue 152 and the exception database 154, and modified GEM 250 and modified MCEMs 252 in the resubmission queue 156.

Figure 9:
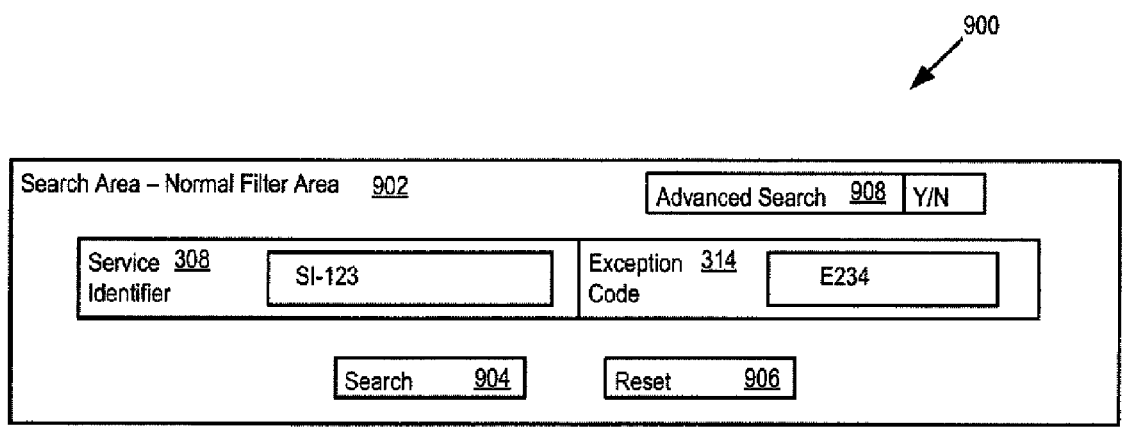
FIG. 9 shows one implementation of a 'search area—normal filter area' display.

FIG. 9 shows one implementation of a 'search area—normal filter area' display 902. In one implementation, the 'search area—normal filter area' display 1002 accepts operator inputs 240 that specify particular CEM filter parameters 242 used to retrieve and display a retrieved CEM 250 and/or MCEMs 252 on the exception message list page 802. The operator of the EHC 148 may use the 'search area—normal filter area' display 902 to execute a search of the exception database 154 using the search button 904 to retrieve and display the CEMs 150 on the exception message list page 802 that match the service identifier 308 and/or exception code 314 specified by the operator. In one implementation, the 'search area—normal filter area' display 902 includes an 'advanced search' button 908 that the operator may use to navigate to a 'search area—advanced filter area' display to perform an advanced search of the exception database 154.

FIG. 10 shows one implementation of a 'search area—advanced filter area' display 1002. The operator of the EHC 148 may use the 'search area—advance filter area' display 1002 to execute a more refined search of the exception database 154 to retrieve and display the CEMs 150 on the exception message list page 802. In one implementation, the 'search area—advanced filter area' display 1002 accepts operator inputs 240 that specify particular CEM filter parameters 242 used to retrieve and display a retrieved CEM 250 and/or MCEMs 252 on the exception message list page 802. The 'search area—advanced filter area' display 1002 may include other CEM filter parameters 242, such as a 'from date/time' 1004 and to 'date/time' 1006 that further refine the search of the exception database 154 for particular CEMs 150.

FIG. 11 shows an example exception message details page 1102. In one implementation, the exception message details page 1102 displays the elements of the CEM wrapper 230 that the operator may edit, confirm a modification, cancel a modification, delete and/or mark as 'Complete' the CEM 150, and resubmit the CEM 150 using the edit button 1106, confirm button 1108, cancel button 1110, delete button 1112 and resubmit button 1114, respectively.

Figure 12:
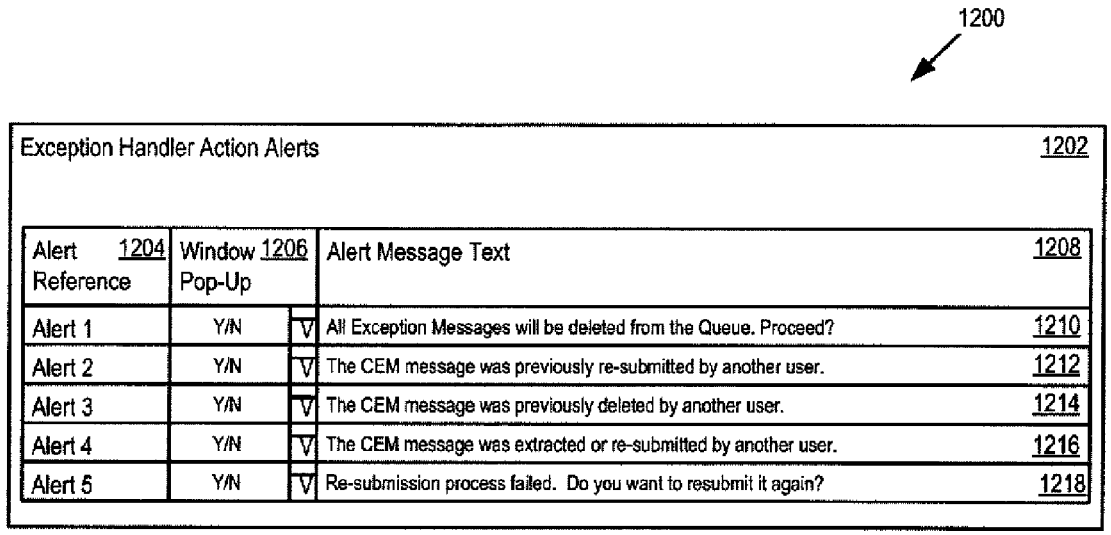
FIG. 12 shows a list of exception handler action alerts.

FIG. 12 shows a list of exception handler action alerts 1202 that the EHC logic 216 may display to the operator of the EHC 148. In one implementation, the alert message text 1210 prompts the operator to confirm acknowledgement that "all exception messages will be deleted from the queue" following the operator selection of the drain resubmission queue 818 button and/or when the operator selects the 'select all' button 810 on the exception message list page 802 followed by the selection of the delete button 814. The EHC logic 216 may prompt the operator with alert message text (e.g., 1212, 1214 and 1216) to inform the operator that another operator has initiated and/or completed an operation on a CEM that the operator has subsequently attempted to edit, delete (e.g., mark as 'Complete'), and/or resubmit.

Figure 13:
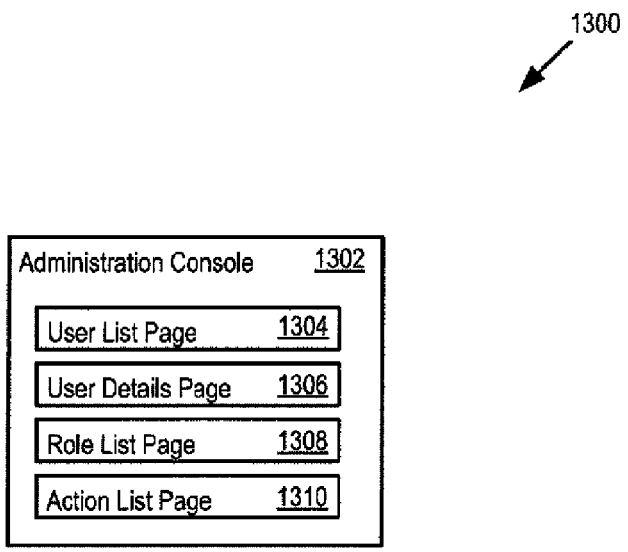
FIG. 13 shows a list of pages for an administration console.

FIG. 13 shows a list of pages for an administration console 1302. In one implementation, the service exception handling system 102 provides an administration console 1302 that includes pages that an administrator can use to identify operators (e.g., a user list page 1304, user details page 1306), assign roles to the operators (e.g., role list page 1308) and authorize actions that the operators and/or roles may perform during the use of the EHC 148 (e.g., action list page 1310).

Figure 14:
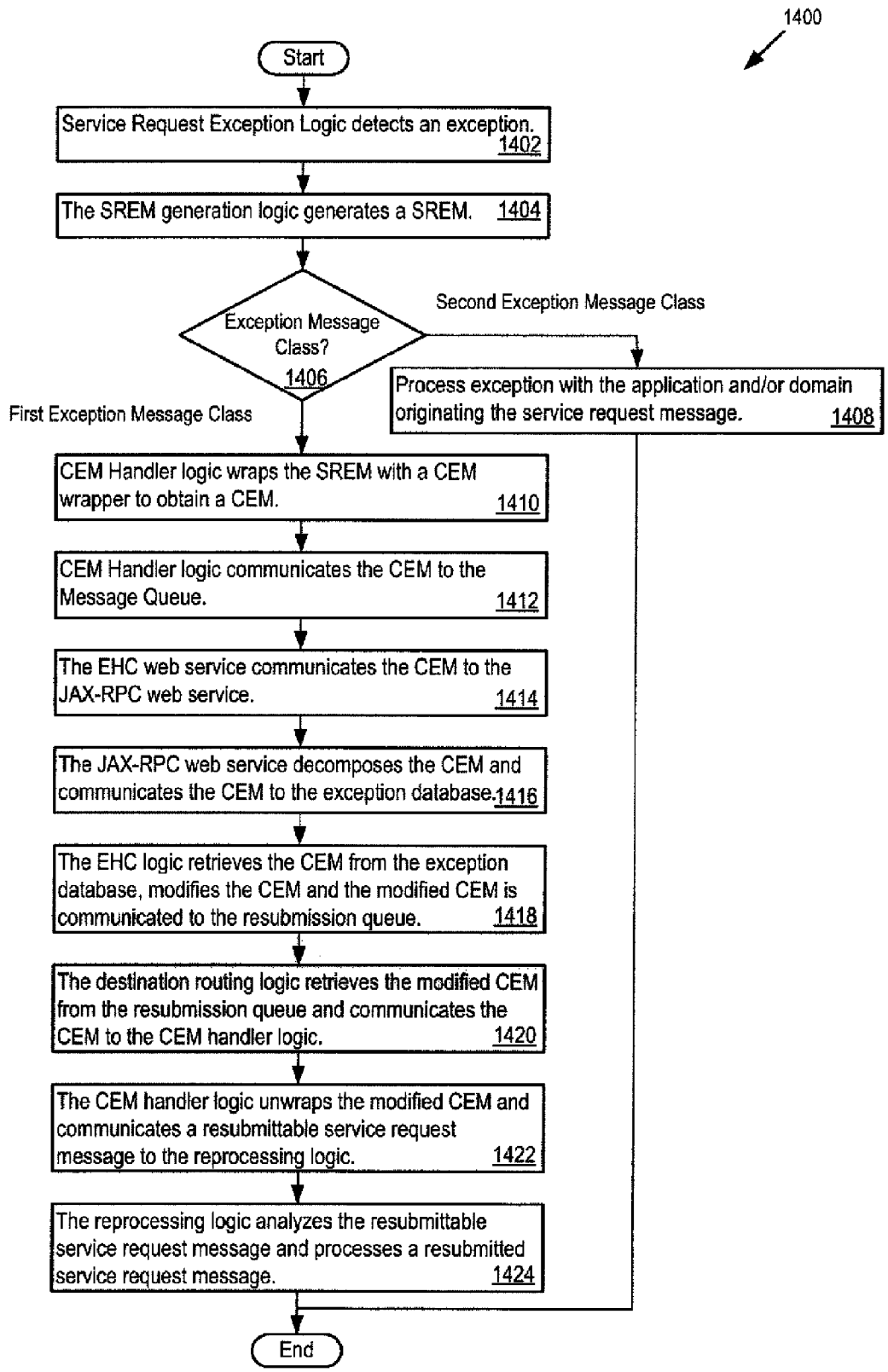
FIG. 14 shows a flow diagram for one implementation of an exception resolution framework.

FIG. 14 shows a flow diagram for one implementation of the exception resolution framework 1400. The service request exception logic 210 detects an exception to processing a service request message 134 (1402). The SREM generation logic 214 generates a service request exception message (SREM) 228 (1404). The exception message classifier logic 212 analyzes the SREM 228 to classify the SREM 228 (e.g., as a first or a second exception message classes—222 and 224) (1406). In one implementation, when the SREM 228 is of the second exception message class 222, the SREM 228 is analyzed and/or processed by the application (e.g., 114, 116 and 158) and/or domain (e.g., 106, 108 and 160) that originated the service request message 134 that resulted in the service request exception 136 (1408).

The SREM 228 is communicated to the CEM handler 146 when the SREM 228 is of the first exception message class 222, and the CEM handler logic 216 wraps the SREM 228 with a CEM wrapper 230, thereby transforming the SREM 228 into a new CEM 232 (1410). The CEM handler logic 216 communicates the new CEM 232 to the message queue 152 (1412). In one implementation, the EHC web service 234 asynchronously retrieves the new CEM 232 from the message queue 152 and communicates the new CEM 232 to the JAX-RPC web service 236 (1414). The JAX-RPC web service 236 decomposes the new CEM 232 in order to identify low level filtering and indexing information that the EHC logic 218 may use to retrieve and analyze CEMs, and stores the decomposed and indexing information in the exception database 154 with the content of the new CEM 232 (1416).

Using the EHC logic 218, the operator of the EHC 148 retrieves a CEM 246, and modifies the GEM to obtain a modified CEM 250. The EHC logic 218 communicates the modified CEM 250 to the EHC web service 234, and the EHC web service 234 communicates the modified CEM 250 to the resubmission queue 156 for reprocessing (1418). The destination routing logic 220 asynchronously retrieves the modified GEM 250 from the resubmission queue 156, analyzes the exception area 314 of a modified CEM 250 and destination routing messages communicated to the destination routing logic 220 from multiple disparate applications (e.g., other applications 158 and other domains 160) to determine where to process the resubmittable service request message 162. The destination routing logic 220 communicates to the GEM handler logic 216 the modified GEM 250 and the location of a service queue corresponding to the reprocessing logic (1420). The CEM handler logic 216 unwraps the modified CEM 250 to obtain the resubmittable service request message 162 and communicates the resubmittable service request message 162 to the reprocessing logic specified by the destination routing logic 220 (1422). The reprocessing logic analyzes the resubmittable service request message 162 and processes a resubmitted service request message 254 (1424).

Figure 15:
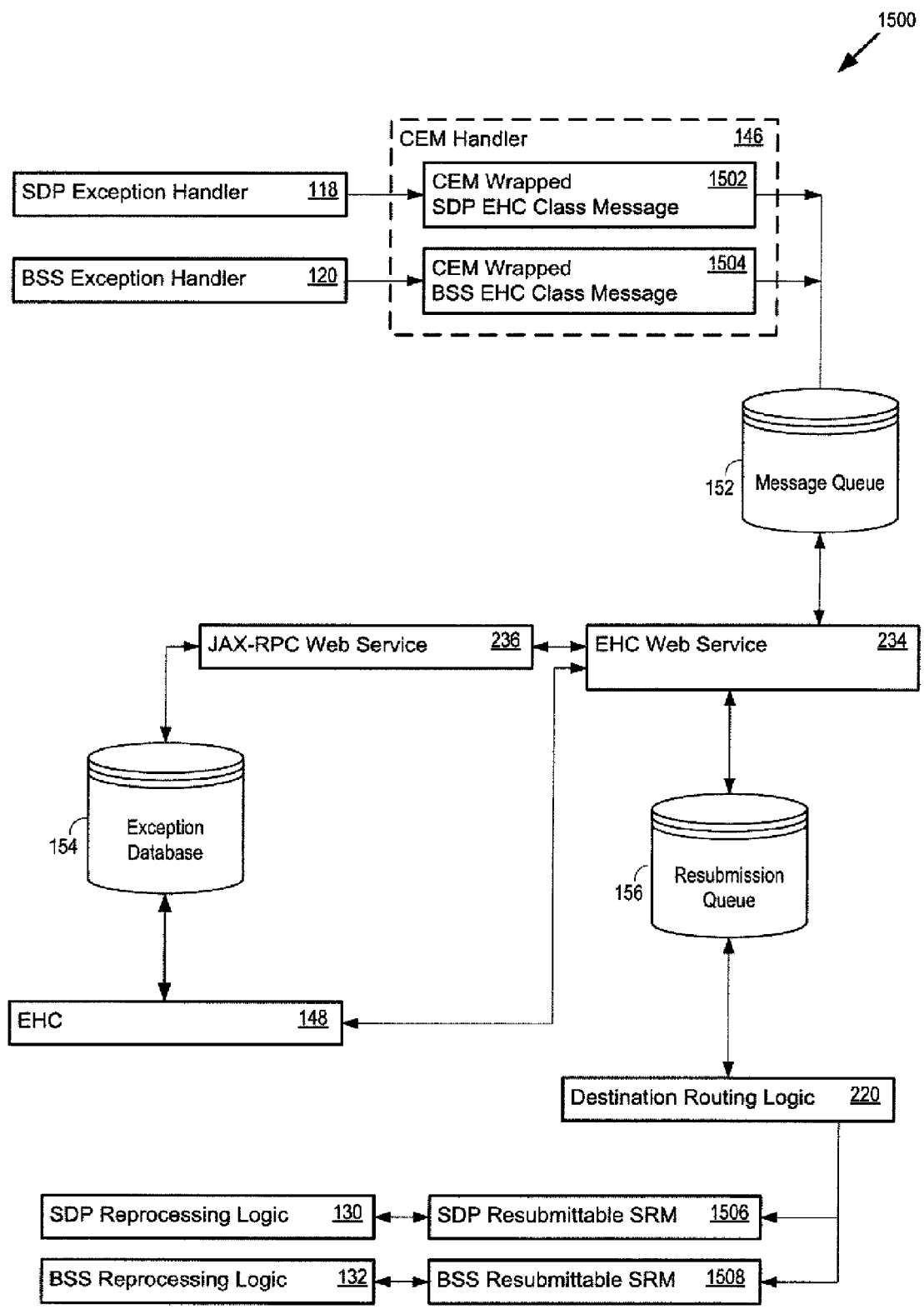
FIG. 15 shows an overview of an exception flow through the system.

FIG. 15 shows an overview of an exception flow through the system 100. The SDP exception handler 118 may use the SDP exception analyzer 122 and the SDP message generator 126 to classify, generate and communicate a SDP SREM 138 as a SDP EHC class message 142 to the GEM handler 146. The CEM handler 146 wraps the SDP EHC class message 142 in a GEM wrapper 230 to transform the SDP EHG class message 142 into a GEM wrapped SDP EHC class message 1502 that the CEM handler 146 communicates to the message queue 152.

The EHC web service 234 asynchronously retrieves the GEM wrapped SDP EHC class message 1502 from the message queue 152, and communicates the CEM wrapped SDP EHC class message 1502 to the JAX-RPC web service 236. The JAX-RPC web service 236 decomposes the GEM wrapped SDP EHC class message 1502 in order to identify low level filtering and indexing information that the EHC 148 may use to retrieve and analyze the CEM wrapped SDP EHC class message 1502. The JAX-RPC web service stores the filtering and indexing information in the exception database 154 with the CEM wrapped SDP EHC class message 1502.

The EHC 148 retrieves the CEM wrapped SDP EHC class message 1502 from the exception database 154, modifies the CEM wrapped SDP EHC class message 1502 using the EHC logic 218. The EHC logic 218 communicates the modified CEM wrapped SDP EHC class message 1502 to the EHC web service 234 and the EHC web service 234 communicates the CEM wrapped SDP EHC class message 1502 to the resubmission queue 156. The destination routing logic 220 asynchronously retrieves the CEM wrapped SDP EHC class message 1502 from the resubmission queue 156 and determines the reprocessing logic (e.g., 130 and 132) to which a resubmittable SRM may be routed. The destination routing logic 220 communicates to the CEM handler logic 216 the modified CEM wrapped SDP EHC class message 1502 and the location of a service queue corresponding to the reprocessing logic identified for processing a SDP resubmittable service request message (SRM) 1506. The CEM handler logic 216 unwraps the modified CEM wrapped SDP EHC class message 1502 to obtain the SDP resubmittable SRM 1506, and communicates the modified CEM wrapped SDP EHC class message 1502 to the SDP reprocessing logic 130 determined by the destination routing logic 220.

The systems may be implemented in many different ways. For example, although some features are shown as computer program products embodied as a signal or data stream and/or stored in computer-readable memories (e.g., as logic implemented as computer-executable instructions or as data structures in memory), all or part of the systems, logic, and data structures may be stored on, distributed across, or read from other machine-readable media. The media may include hard disks, floppy disks, CD-ROMS, a signal, such as a signal received from a network or partitioned into sections and received in multiple packets communicated across a network. The systems may be implemented in software, hardware, or a combination of software and hardware. The XML files, schemas, CEM wrappers, service request messages, service request exception messages and other messages used by the system may employ formats that are different from the formats described above. In one implementation, the CEM header information may be communicated separately from the SREM so that the use of a CEM wrapper is optional. The system may also use different message formats instead of XML, such as encoded packets with bit fields that are assigned specific meanings.

Furthermore, the systems may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the service exception have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for implementing a service exception resolution framework for a system architecture comprising:
    detecting a first exception to processing a service request message;
    generating a service request exception message (SREM) responsive to detecting the first exception, wherein the first exception is distinguishable from a second exception, and wherein the first exception and the second exception originate from multiple disparate applications across the system architecture;
    analyzing the SREM with an exception message classifier to distinguish the SREM between a first exception message class and a second exception message class, wherein the first exception message class represents multiple exception types including an asynchronous exception to resolve in non-real time,
        wherein distinguishing the SREM to be of the first exception message class, the method further comprises:
            communicating the SREM to a common exception message (CEM) handler;
            executing the CEM handler to wrap the SREM with a universal CEM wrapper, thereby transforming the SREM into a new CEM; and
            communicating the new CEM to a centralized exception database that stores multiple CEMs, including the new CEM, originating from the multiple disparate applications across the system architecture.

2. The method of claim 1, wherein communicating further comprises:
    sending the new CEM to a message queue;
    sending asynchronously the new CEM from the message queue to the centralized exception database;
    storing the new CEM in the centralized exception database; and
    retrieving asynchronously the new CEM from the centralized exception database.

3. The method of claim 1, further comprising:
    initiating execution of an exception handling console; and
    retrieving the new CEM from the centralized exception database using the exception handling console.

4. The method of claim 3, further comprising:
    accepting operator input to modify the new CEM; and
    modifying the new CEM according to the operator input to obtain a modified CEM.

5. The method of claim 4, further comprising: resubmitting the modified CEM for processing to at least one of the multiple disparate applications when the SREM is of the first exception message class, and sending the SREM to the originating application when the SREM is of the second exception message class.

6. The method of claim 3, further comprising: applying a preconfigured CEM change specifier to automatically modify the CEM to obtain the modified CEM.

7. The method of claim 6, further comprising resubmitting the modified CEM for processing to at least one of the multiple disparate applications.

8. The method of claim 1, further comprising:
    initiating execution of an exception handling console;
    accepting CEM filter parameters at the exception handling console;
    retrieving matching CEMs that match the CEM filter parameters from the centralized exception database;

modifying the CEMs; and
resubmitting the modified CEMs for processing.

9. The method of claim 8, further comprising: storing the modified GEMs in a resubmission queue; and resubmitting the modified CEM from the resubmission queue.

10. The method of claim 8, further comprising: unwrapping at least one of the modified CEMs to obtain a resubmittable SREM.

11. The method of claim 10, further comprising: communicating the resubmittable SREM to a service provider responsive to the service request message originating from the at least one of the multiple disparate applications.

12. The method of claim 1, wherein distinguishing the SREM to be of the second exception message class, the method further comprises sending the SREM to the originating application.

13. A system for implementing a service exception resolution framework for a system architecture comprising:
a processor;
a memory coupled to the processor, the memory comprising:
service request exception detection logic operable to detect a first exception to processing a service request message;
service request exception message (SREM) generation logic operable to:
generate a SREM responsive to detecting the first exception;
distinguish the first exception from a second exception, wherein the first exception and the second exception originate from multiple disparate applications across the system architecture;
exception message classifier logic operable to:
analyze the SREM to distinguish the SREM between a first exception message class and a second exception message class, wherein the first exception message class represents multiple exception types including an asynchronous exception to resolve in non-real time,
wherein distinguishing the SREM to be of the first exception message class further causes the exception message classifier logic to communicate the SREM to a common exception message (CEM) handler; and
CEM handler logic operable to:
execute the CEM handler to wrap the SREM with a universal CEM wrapper, when the SREM is of the first exception message class, to thereby transform the SREM into a new CEM; and
communicate the new CEM to a centralized exception database that stores multiple CEMs, including the new CEM, that originate from the multiple disparate applications across the system architecture.

14. The system of claim 13, further comprising logic operable to:
send the new CEM to a message queue;
send asynchronously the new CEM from the message queue to the centralized exception database;
store the new CEM in the centralized exception database; and
retrieve asynchronously the new CEM from the centralized exception database.

15. The system of claim 13, the memory further comprising exception handling console logic operable to: initiate execution of an exception handling console; and retrieve the new CEM from the centralized exception database.

16. The system of claim 15, the exception handling console logic further operable to: accept operator input to modify the new CEM; and modify the new CEM according to the operator input to obtain a modified CEM.

17. The system of claim 16, the exception handling console logic further operable to resubmit the modified CEM for processing to at least one of the multiple disparate applications when the SREM is of the first exception message class, and sending the SREM to the originating application when the SREM is of the second exception message class.

18. The system of claim 15, the exception handling console logic further operable to apply a preconfigured CEM change specifier to automatically modify the CEM to obtain the modified CEM.

19. The system of claim 18, the exception handling console logic further operable to resubmit the modified CEM for processing to at least one of the multiple disparate applications when the SREM is of the first exception message class, and sending the SREM to the originating application when the SREM is of the second exception message class.

20. The system of claim 13, further comprising an exception handling console comprising exception handling console logic operable to:
accept CEM filter parameters at the exception handling console;
retrieve matching CEMs that match the CEM filter parameters from the centralized exception database;
modify the CEMs; and
resubmit the modified CEMs for processing.

21. The system of claim 20, exception handling console logic further operable to: store the modified CEMs in a resubmission queue; and
resubmit the modified CEM from the resubmission queue.

22. The system of claim 20, further comprising logic operable to unwrap at least one of the modified CEMs to obtain a resubmittable SREM.

23. The system of claim 22, further comprising logic operable to communicate the resubmittable SREM to a service provider responsive to the service request message originating from the at least one of the multiple disparate applications.

24. The system of claim 13 wherein distinguishing the SREM to be of the second exception message class further causes the exception message classifier logic to send the SREM to the originating disparate application.

25. A product comprising:
a non-transitory machine-readable medium;
service request exception logic stored on the non-transitory machine-readable medium and executable by a processor coupled to the non-transitory machine-readable medium, wherein the service request exception logic when executed by the processor:
detects a first exception to processing a service request message;
generates a service request exception message (SREM) responsive to detecting the first exception, wherein the first exception is distinguishable from a second exception, and wherein the first exception and the second exception originate from multiple disparate applications across the system architecture;
analyzes the SREM to distinguish the SREM between a first exception message class and a second exception message class, wherein the first exception message class represents multiple exception types including an asynchronous exception to resolve in non-real time,
wherein distinguishing the SREM to be of the first exception message class further causes the service request exception logic to communicate the SREM to a common exception message (CEM) handler;
wherein distinguishing the SREM to be of the second exception message class further causes the service request exception logic to send the SREM to the originating disparate application; and
executes the CEM handler to wrap the SREM with a universal CEM wrapper, thereby transforming the SREM into a new CEM; and
communicates the new CEM to a centralized exception database that stores multiple CEMs, including the new CEM, originating from the multiple disparate applications across the system architecture.

* * * * *